UNITED STATES PATENT OFFICE.

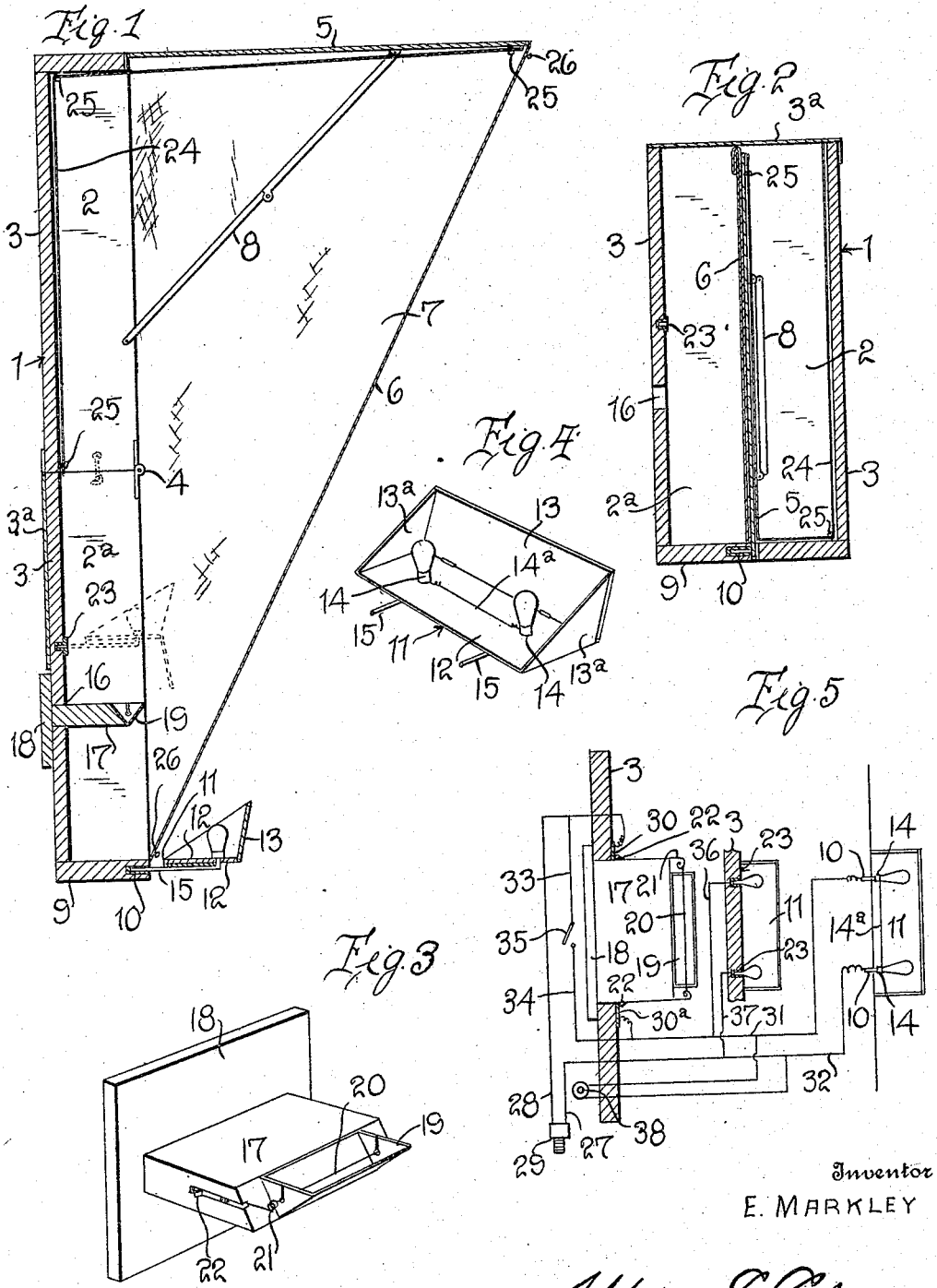

EUGENE MARKLEY, OF CAIRO, NEBRASKA.

PHOTOGRAPHIC LIGHTING APPARATUS.

1,185,921.  Specification of Letters Patent.  Patented June 6, 1916.

Application filed September 15, 1915. Serial No. 50,878.

*To all whom it may concern:*

Be it known that I, EUGENE MARKLEY, a citizen of the United States, residing at Cairo, in the county of Hall and State of Nebraska, have invented certain new and useful Improvements in Photographic Lighting Apparatus, of which the following is a specification, reference being had to the accompanying drawings.

My invention relates to the art of photography, and particularly to devices for providing artificial light whereby photographs may be taken.

The primary object of my invention is the provision of a lighting apparatus wherein flash light powder or lamps may be used, and so constructed that the apparatus may be folded up into a compact cabinet or carrying case.

A further object of my invention is the provision of a photographic lighting apparatus wherein a casing is provided having a relatively thin cloth screen, a flash light being ignited within the casing and behind the screen so that the flash light is diffused.

A further object of the invention is the provision of a photographic lighting apparatus wherein a casing is provided having a back and top so constructed as to reflect the light at a proper angle and a screen of relatively thin cloth for diffusing the light, means being provided for either igniting a flash light within the casing and behind the screen, or using relatively powerful electric lamps within the casing and behind the screen.

A further object of the invention is to provide a lighting apparatus of the character described which will form a chamber within which the flash light is ignited to thereby arrest or retain the smoke or other gaseous product generated when the flash powder is ignited.

A further object of my invention is the provision in connection with a casing as before stated within which a flash light may be ignited, of further means for lighting the subject so that focusing may be done, said means, however, being extinguished automatically upon the ignition of the flash light.

Still another object of my invention is the provision of a flash light case, as previously referred to, wherein the front of the casing which is formed as before stated of relatively thin white cloth, acts either as a diffuser for light behind the screen, or as a reflector for the light in front of the screen whereby the focusing is done.

A further object of the invention is to provide a portable lighting device which may be used by amateurs as easily as by professionals, set up in any place desired, and which will be particularly effective for the purposes intended.

A further object of the invention is the provision of means whereby the whole of a charge of flash light powder may be ignited simultaneously or ignited at once, this means consisting of a fuse wire of such composition that it will heat sufficiently as to ignite the powder over the whole length of the wire before it fuses at any one point.

A further object of the invention is the provision of a lighting apparatus of the character described, so constructed that the casing when folded not only is rendered very compact but also provides a carrying case in which photographic materials may be readily transported.

Still another object of the invention is the provision of a photographic lighting apparatus of the character described wherein means are provided for detachably disposing a light reflecting medium within the case.

Other objects will appear in the course of the following description.

My invention is illustrated in the accompanying drawings, wherein:

Figure 1 is a vertical section of my lighting cabinet in its extended position; Fig. 2 is a like section to Fig. 1 but showing the lighting cabinet closed to form a carrying case; Fig. 3 is a perspective detail view of the flash powder support; Fig. 4 is a perspective detail view of the lamp support 11; Fig. 5 is a horizontal sectional view showing diagrammatically the wiring connections of the lighting apparatus.

Referring to these drawings, 1 designates generally a sectional carrying case or cabinet. Each section is rectangular in form and open at adjacent ends when the case is extended as in Fig. 1. One of these sections is designated 2 and the other section 2ª. Each of these sections is formed with a solid back 3. The sections are hinged together at 4 so as to permit the sections to be turned over upon each other in the manner shown in Fig. 2. When so turned over the cabinet is closed by means of a top or closure plate 3ª which is hinged to the adjacent end of the section 2 and hangs down exterior to and at the back of the cabinet when the cabinet is extended as in Fig. 1.

Hinged to the top wall of the section 2 and adapted to extend out therefrom in a horizontal plane is a plate or web 5 which may be of any suitable light but sufficiently strong material, which plate by reason of its being hinged, may be swung down so as to lie flat against the open face of the section 2 as shown in Fig. 2. Attached to the bottom of the section 2ª and extending upward to the free edge of the top 5 is a sheet 6 of thin white material such as muslin. Attached to the side edges of the plate 5 and to the side walls of the sections 2 and 2ª are the side pieces 7 also of muslin or like flexible material stitched or otherwise attached to the piece 6. The top or plate 5 may be held in its extended or horizontal position in any suitable manner, as by braces 8, these braces being foldable within the casing formed of the sections 2 and 2ª. The bottom wall 9 of the section 2ª is formed with sockets 10 spaced from each other whereby a reflector and lamp support illustrated in Fig. 4 and designated generally 11 may be attached to the lower end of the section 2ª and project out in front of the sheet of material 6. As illustrated in Fig. 4, this lamp support is made of metal and has a floor 12, a back 13 hinged to the floor and formed of reflecting material, and the end pieces 13ª. The back 13 is hinged to the floor 12 for certain purposes which will be later stated. Disposed within the lamp support are the lamp sockets 14 electrically connected to each other as by a conductor 14ª and adapted to receive any ordinary incandescent electric lamps. These lamp sockets 14 are connected in series to the pins or plugs 15 which are adapted for insertion within the sockets 10, these sockets 10 being provided with connections whereby current may be supplied to the lamps, as will be later stated.

The back 3 of the section 2ª is formed a little below the middle with a slot 16 for the insertion of a flash light powder support, this support carrying a trough wherein the flash light powder is intended to be placed. As illustrated in Fig. 3, this trough 19, which is about three or four inches long and which should be capable of holding about four teaspoonfuls of powder for a maximum charge, is mounted upon a strip 17 in turn mounted upon a back 18. The strip 17 has the same size as the slot 16 so that it may be inserted through the slot with the back 18 against the back of the casing. The depth of the trough is slightly less than the thickness of the strip 17 and the trough is slightly less in length than the strip so that the trough will not interfere with the insertion of the strip 17 into the slot 16 or the withdrawal of the trough from the casing.

Disposed within the trough or pan 19 is a very fine wire or electric fuse of sufficient amperage to carry current for the lamps used for focusing. This wire or fuse 20 is stretched taut along the pan or gutter 19 and is held in a stretched condition by means of the springs 21, the wire forming the fuse having loops at its ends engaged by the ends of the springs. The purpose of this fuse wire is to cause the ignition of the flash light powder. Preferably I use a fuse of a capacity to carry sufficient current, as for instance, a current of about 200 watts, the fuse, however, being weak enough not to burn out the average fuse of the house lighting system when the fuse 20 is burned to ignite the powder. Regular electric fuse wire will answer the purpose, but I prefer to use a fine strand of wire harder than the regular electric fuse wire as this becomes heated to a high temperature before it fuses, a temperature sufficiently hot so that the whole wire will "fire" before it fuses at any one point. The springs 21 are preferably of copper wire, or other conductive material, and the ends of the springs are disposed in grooves in the side edges of the strip 17 and extend rearward to certain catches 22 which are formed of copper and act to hold the fuse trough support in place in the casing and also to make electrical connections with the wiring of the casing as will be later described.

It will be noted that the fuse wire 20 extends out through slots formed in the ends of the trough 19, and that the extremities of the fuse wire are formed with loops which engage with the ends of the springs 21, these strips being disposed in grooves and extending back to the catches 22. The object of this construction is as follows: The fuse being formed with loops at its ends engaging with the springs 21 on the exterior of the pan, the heating and fusing of the wire occurs on the inside of the pan, the double thickness of the fuse at the loops preventing the heating and fusing of the wire on the outside of the pan. The springs 20 keep this fuse wire 20 taut and inasmuch as the contacts 22 extend back to the middle of the block 17, some distance away from the fuse wire, protection is afforded from the contacts being coated with the products of explosion and thus rendering these fuse contacts non-conducting, which would be the case were these contacts disposed in proximity to the fuse.

The back of the section 2ª of the casing is formed at about its middle with sockets 23 adapted to receive the plugs 15 of the lamp support illustrated in Fig. 4 so that this lamp support may be disposed within the casing when it is extended, as illustrated in dotted lines in Fig. 1, or so that in certain cases the lamps may be disposed exterior to the casing, as illustrated in full lines in Fig. 1, as well as within the casing itself. Where the lamps are disposed within the casing or cabinet they are to be used in place of the flash powder for illuminating purposes. Under these circumstances it is necessary of course that they should have a relatively high candle power, and to that end I would use nitrogen lamps, that is, incandescent lamps the bulbs of which are filled with nitrogen. When the nitrogen lamps are mounted within the casing by engaging the plugs or pins 15 of the lamp support with the sockets 23, the back of the casing is turned down so that it will not obstruct the light in any way or prevent the light from being reflected from the back 3 of the casing, the top wall of the casing and the plate 5. It is for this reason that the back 13 is hinged to the bottom 11 of the lamp support. Where the lamps are disposed within the casing the back and top of the cabinet or case becomes the reflector and reflect the light forward and downward while the screen 6 in front diffuses the light. Now where my lighting cabinet has been used for a considerable time with flash powder, the back and top of the cabinet become quite dark because of the smoke. This would cause them to absorb light. In order to avoid this I provide a piece of muslin or other like material, designated 24, which is adapted to be attached to the under face of the plate 5 and to the back 3 and extend down to the lower end of the section 2 of the casing. Preferably, this reflecting sheet of material 24 is attached to the top 5 and to the back 3 by means of buttons 25 or like devices. This reflecting sheet 24 may be readily reversed when it becomes darkened, or be renewed from time to time. Where, however, outside light, that is, the lamps shown in full lines in Fig. 1, are used as in taking portraits, the reflecting sheet 24 which is ordinarily used on the inside of the case, could be stretched over the outside of the sheet 6 and fastened at top and bottom by buttons 26, as the length from the end of the plate 5 to the lower end of the section 2 will be about the same as the length of the sheet 6. The use of this reflecting sheet 24 upon the exterior face of the sheet 6 is particularly desirable where pictures are being taken entirely by the lamps supported upon the exterior of the casing as the diffusing screen or sheet 6 is not a perfect reflector as some of the light would shine through. It will serve, however, as a reflector for use in focusing but it will not be practicable for use with exposing light. The sheet 24 should preferably be fire-proof so that it need not be removed when the case is to be used for flash light work. The reflecting sheet 24 can be cheaply renewed, and it will be obvious that it may be readily detached or attached when the case is folded, as, after the case is folded, every button 25 would be accessible through the end of the case.

The electrical connections whereby the fuse is blown or the lights in the sockets 14 energized are as follows, special reference being made to the diagram, Fig. 5: 27 and 28 designate wires leading from the source of current, these wires terminating as shown in a plug 29 whereby they may be connected to an ordinary electric light socket. The wire 28 extends into the case and to a contact member 30 which is adapted to electrically engage one of the catches 22 when the flash light powder trough is in place. From the opposite contact 30$^a$ extends a wire 31 which leads to one of the sockets 10. From the other socket 10 leads a conductor 32 which connects with the wire 27. Bridging the wires 28 and 31 are the conductors 33 and 34 adapted to be connected by means of a switch 35, preferably mounted upon the back of the case or cabinet or in any other accessible position. It will thus be seen that current will pass through this switch when it is closed and that while this switch is closed the lamps engaging the sockets 10 will be energized. Also connected to the conductor 31 or otherwise electrically connected to the wire 34 is the conductor 36 which leads to one of the lamp sockets 23. From the other lamp socket leads the wire 37 to the return wire 27 so that when the lamp supporting device 11 is disposed within the casing and its pins or plugs 15 are inserted in the sockets 23, current may pass through these lamps if the switch 35 is closed. The wires 31 and 32 are electrically connected to a circuit closer or switch 38, preferably having the form of a button circuit closer. This circuit closer is normally open, that is, no current passes through the circuit closer unless the button is depressed.

It is to be understood that when a lamp holder 11 is mounted within the casing, that is, engaged with the sockets 23, the fuse is not used, and under these circumstances the switch 35 is closed so that current will then pass from the source of power through the nitrogen lamps mounted in the lamp holder and through wire 37 to the return wire 27. When, however, the fuse is to be used for firing flash powder, the lamp support 11 is mounted upon the exterior of the casing, its pins or plugs 15 being engaged in the sockets 10. The switch 35 under these circumstances is open, that is, positioned so as to break the circuit through the wires 33 and 34. The current therefore in passing to the sockets 10 must pass through the fuse 20. Now when the wires 31 and 32 are short-circuited by closing the switch 38, the fuse 20 will blow out, igniting the flash light powder, the lamps in the holder 11 simultaneously being extinguished. If after the powder is ignited it is desired to again light the lamps in the holder 11 the switch 35 is closed permitting curent to pass around the fuse and so completing the circuit through the wires 31 and 32 to the wires 28 and 27.

It will be seen now that with my device the electric lights in the reflector are de-energized immediately that the flash light powder is ignited. By having the current pass through the fuse to the electric lights I provide a way of testing the electrical connections so as to see if the connections to the fuse are perfect. Furthermore, the putting out of the electric lights immediately that the flash powder is ignited obviates any blur that might occur through the subject closing his eyes and the shutter of the camera not closing instantly. Where a picture is being taken by a flash light, the subject almost invariably closes his eyes upon the explosion of the flash powder. This closing of the eyes, however, occurs after the flash has taken place. If now the shutter is slower than the duration of the flash and there is artificial light in the room, as for instance the lights mounted in the holder 11, a further impression will be made upon the negative and the picture will be blurred. This is entirely avoided by the mechanism before described. It is also to be particularly pointed out that with my device flash powder is scattered along the trough or gutter 19 and the whole amount of the powder is ignited instantly, thus making a much quicker flash with less noise than if the powder were ignited from one point only or from a plurality of points.

Where the lamp holder 11 is disposed upon the outside of the case or cabinet the lights are used for the purpose of illuminating the sitter sufficiently to permit focusing and to further aid in judging the amount of light on the face, that is, proportion of light and shade. Furthermore, this light is thrown upon the sitter at about the same angle as illumination from the flash charge, and furthermore, the rays from the lamps are diffused on the screen and this diffusion is about the same as from a flash set off from behind the screen. This makes focusing and judgment of light effects relatively easy. As heretofore described, it is possible to use high candle power lamps within the casing and not use the flash, or it is possible to use lamps either or both within and exterior to the casing without the use of the flash.

It is to be noted that the support for the flash powder pan 19 may be readily inserted or withdrawn and thus it may be readily cleaned and loaded with fuse and powder and further two exposures can be made without releasing the smoke generated by the explosion of the first charge. The smoke may be allowed to pass off from the interior of the casing by partially or wholly folding the sections 2 and 2ª together, thus obviating any necessity for a special door to permit the egress of smoke. Furthermore, it is pointed out that the action of folding the case or cabinet automatically forces out the smoke contained therein.

It is to be particularly noted that my carrying case when folded forms two compartments or chambers inclosed by the case. The fact that the reflector sheet 24 may be disposed either on the inside of the case when extended or on the outside thereof over the screen 6, is very important, as without this removable and reversible sheet 24 the back and top of the inside of the case would become very dark, thus absorbing a great deal of light and requiring more flash powder. It will be seen that my case is extremely portable, that it folds to provide two compartments which are entirely free from internal mechanism, that the device reflects as well as diffuses light, that it retains the smoke of the exploded charge, and that the interior of the case is readily accessible when the case is folded. Furthermore, it is adaptable to both electric and flash lighting portraiture or picture taking. By my system of ignition I accomplish the two-fold purpose of igniting the flash powder and automatically extinguishing the lights, and by the use of a fuse which "fires" for its whole length before fusing at any one point, I secure an ignition of the flash light picture along its entire extent.

Having thus described my invention, what I claim is:

1. A photographic lighting apparatus comprising a casing formed in two sections hinged to each other for movement into or out of parallel relation, each section comprising a rear wall, an end wall and two side walls, the abutting ends of the sections when the sections are in line opening into each other, an extension top hinged to one of the sections of the case and movable into a horizontal position at right angles to the plane of the case or against the open front of the section to which it is hinged to thereby form a partition between the sections when the sections are folded into parallel relation, flexible side pieces attached to the case and the margin of said top, and a flexible screen of light diffusing material attached to the free edge of the top and to the opposite end of the other section of the casing, and means for igniting flash light powder within the case.

2. A photographic lighting apparatus having a screen of light diffusing material, means for igniting flash light powder behind the screen, and an electric light support disposed in front of the screen and including a reflector directing the rays of light upward against said screen.

3. A photographic lighting apparatus including a screen of light diffusing material, a flash light powder support disposed behind the screen and including an ignition means, an electric lamp support mounted in front of the screen, and means for causing the ignition of the flash light powder and the simultaneous deënergizing of the lamps.

4. A photographic lighting apparatus comprising a case formed of foldable sections, a screen operatively supported upon said case and held in a stretched position when the sections are unfolded, said screen being formed of relatively thin flexible light diffusing material, means for igniting flash light powder behind said screen, an electric lamp support detachably mounted in front of the screen, and means for causing the ignition of flash light powder and the simultaneous deënergizing of the lamps on said support.

5. A photographic lighting apparatus comprising a case formed of two hinged sections, an extension top hinged to the top of one of said sections and adapted to be turned into parallel relation thereto to form a partition between said sections when folded or to be turned at right angles thereto, a screen of flexible relatively thin light diffusing material attached to the free edge of said top and to the bottom of the case, and sides of flexible material attached to the top of the case and the sides of the screen.

6. A photographic lighting apparatus comprising a case composed of foldable sections, said case having a screen of relatively thin flexible light diffusing material, means within the case for igniting flash light powder behind said material, a reflector detachably mounted upon the front of the case in front of the screen and having electric lamps mounted thereon, sockets formed upon the case with which said lamps are detachably and electrically connected, electrical connections adapted to be connected to a source of current and including the ignition means and said lamps in circuit with said source of current, and means for cutting out the lamps and simultaneously actuating the ignition means.

7. A photographic lighting apparatus including a screen, a support therefor, a flash light pan disposed behind the screen and mounted upon the support, means for detachably supporting electric lamps upon the support in front of the screen or behind the screen, and means for igniting the charge in the pan and for simultaneously deënergizing the lamps.

8. In a flash light apparatus of the character described including an upwardly and outwardly inclined screen, a flash light pan disposed behind the screen, means for detachably supporting electric lights either in front of the screen or behind the screen, and means for firing the charge in the flash light pan and simultaneously deënergizing the lights disposed in front of the machine.

9. A photographic lighting apparatus including a screen, a support therefor, the support having electrical sockets formed in it behind the screen and in front of the screen at the lower end thereof, an electric light support including plugs insertible in said sockets, said support being disposable either in front of the screen or behind the screen, a flash light pan detachably mounted upon the support, igniting means disposed in connection with the pan, electrical connections from said sockets and from said igniting means to a source of current, and means whereby the connections from the sockets disposed in front of said screen shall be electrically disconnected from the source of energy upon the actuation of the igniting device.

10. In a photographic lighting apparatus of the character described, a case formed in two sections, each section being open on one face and at one end, the open ends of the sections being hinged to each other whereby said sections may be turned from a position in alinement into a parallel position to each other with the open faces of the sections confronting each other, the open ends of the sections thereby providing a hand opening extending entirely across one end of the case, means disposed on the back of one of said sections for supporting and igniting flash light powder, and a flexible screen extending across the open face of the case.

11. In a photographic lighting apparatus of the character described, a case formed in two sections, each section being open on one face and at one end, the open ends of the sections being hinged to each other whereby said sections may be turned into or out of a parallel relation, said sections when turned into an alining relation abutting against each other at their open ends but when turned into a parallel relation having their open faces confronting each other, a screen supporting member hinged to the closed end of one of said sections and adapted to be moved into a parallel relation to said section or into angular relation thereto, and a screen attached to the free edge of said member and the opposite closed end of the opposite section whereby said member may be moved into a position to form a partition between the two sections of the case when they are folded into parallel relation.

12. A photographic lighting apparatus comprising a case made in two sections, each section being open upon one side and upon one end, the open end of the sections being hinged to each other, a member hinged to the closed end of one of the sections and movable into a horizontal position when the sections are disposed in a vertical position, a light diffusing screen of flexible material attached to the extremity of said hinged member and extending to the opposite section, said screen being foldable into place between the sections when the sections are folded, and a flash light powder support insertible through the back of one of the sections and including a pan and an igniting device.

13. A photographic lighting apparatus comprising a case made in two sections, each section being open upon one side and upon one end, the open end of the sections being hinged to each other, a member hinged to the closed end of one of the sections and movable into a horizontal position when the sections are disposed in a vertical position, a light diffusing screen of flexible material attached to the extremity of said hinged member and extending to the opposite section, said screen being foldable into place between the sections when the sections are folded, and a flash light powder support insertible through the back of one of the sections and including a pan and an igniting device, the lower end of that section opposite the hinged screen supporting member being formed with electrical sockets and a light support having plugs insertible into said sockets, said light support being normally disposed exterior to and at the lower end of the screen.

14. A photographic lighting apparatus comprising a case made in two sections, each section being open upon one side and upon one end, the open end of the sections being hinged to each other, a member hinged to the closed end of one of the sections and movable into a horizontal position when the sections are disposed in a vertical position, a light diffusing screen of flexible material attached to the extremity of said hinged member and extending to the opposite section, said screen being foldable into place between the sections when the sections are folded, and a flash light powder support insertible through the back of one of the sections and including a pan and an igniting device, the lower end of that section opposite the hinged screen supporting member being formed with electrical sockets, the back of the same section of the case being also formed with electrical sockets, and an electric lamp support having plugs engageable with either of said sets of sockets and connections from said sockets to a source of current.

15. In a photographic lighting apparatus of the character described, a casing having a light diffusing screen extending across its front, the back of the casing being slotted, electrical connections from a source of energy terminating at each side of the slot, a flash light pan, a support carrying said pan and adapted to be inserted through the slot, oppositely disposed springs at the ends of said pan and mounted upon the support, a fuse connected to said springs and drawn taut thereby, and contact members electrically connected to said springs and acting as catches, said contact members being mounted on the pan support and adapted to engage the terminals of said electrical connections on the back when the pan support is in place.

16. In a photographic lighting apparatus of the character described, a case open in front and having a top and back, a screen extending downward from the top to the bottom of the case, a reversible reflecting sheet, and fastening devices detachably connecting the reflecting sheet to the top and the back.

17. A photographic lighting apparatus of the character described including a case open in front and having a top and back, a light diffusing screen extending downward from the top to the bottom of the case across its front, buttons attached to the inner faces of the case along its top and back, and a reversible reflecting screen detachably connected to said buttons, extending over the inner face of the back of the case and the inner face of the top thereof.

18. A portable photographic lighting apparatus comprising a case formed in two sections each of said sections having a solid back and being closed at the sides and one end, the open ends of the casing being hinged to each other, a screen supporting member hinged to the end of one of said sections and movable from a position parallel to the sections to a position at right angles thereto, a flexible light diffusing screen attached to the end of said screen supporting member and to the opposite end of the casing, said member when the sections are folded forming a partition extending through the sections, and a cover hinged to the open end of one of the sections and movable into position over both of the sections when the sections are folded.

19. In a photographic lighting apparatus of the character described, a casing, a screen extending across the front of the casing, said screen being formed of light diffusing material and when in position extending downward and rearward, means for supporting electric lamps at the lower end of said screen, means for reflecting the light of said lamps upward against the screen, and a reflecting sheet adapted to be detachably connected to the front of the screen.

20. In a photographic apparatus of the character described comprising a casing, a screen attached to the casing and extending downward and rearward at an inclination, said screen being of light diffusing material, means for supporting and igniting the charge of flash light powder behind the screen and within the casing, and a sheet of light reflecting material adapted to be attached to or detached from the front of the screen.

21. In a photographic lighting apparatus of the character described, a case formed in two sections foldable upon each other, the sections having open adjacent ends, each section having a back, side walls, and an end wall, the side walls of the sections being hingedly connected to each other, a screen operatively supported upon the front of the sections and extending thereacross, flexible side pieces attached to said screen and to the side walls of the sections to thereby form when the sections are opened a casing having practically imperforate walls, means whereby flash light powder may be exploded within the casing, the imperforate casing preventing the diffusion of products of combustion, said products of combustion when the casing is folded passing out through the open ends of the casing sections, the closing of the casing acting to force out the products of combustion.

22. A carrying case of the character described, comprising two sections each having a back, opposite sides, and an end member, the open ends of the sections being hinged to each other, one of said sections being provided with a hinged member adapted to be extended at right angles to the back or folded into a position against the open front of one of the sections and parallel to the back, and means for detachably supporting the hinged member in a plane at right angles to the back of the section.

23. The combination with a pan adapted to contain flash light powder and having end members formed with openings, of a fuse wire extending longitudinally of the pan and having its ends projecting through the openings, the fuse wire being formed with loops at its ends beyond said openings, and electrical connections from a source of energy engaging with the looped ends of the fuse wire whereby the heating and fusing of the wire shall occur on the inside of the pan.

24. The combination with a pan adapted to contain flash light powder, of a fuse wire disposed within the pan and having its ends projecting beyond the pan, and electrical connections whereby current may be passed through the fuse wire and including oppositely disposed springs expansible outward in opposite directions and holding the fuse wire taut.

25. The combination with a pan adapted to contain flash light powder and a support for said pan, of a fuse wire extending through the ends of the pan, electrical connections engaging the ends of the fuse wire and extending rearward upon said support a distance from the pan, terminal contacts with which said electrical connections are engaged, and a member having permanent electrical connections including spaced contacts with which said first named contacts are slidingly and detachably engaged.

In testimony whereof I hereunto affix my signature in the presence of two witnesses.

EUGENE MARKLEY.

Witnesses:
T. H. MORUSEN,
H. P. BELLOWS.